UNITED STATES PATENT OFFICE.

JOSEPH WURZNER, OF CHICAGO, ILLINOIS.

IMPROVEMENT IN AIR-DRIED BRICKS.

Specification forming part of Letters Patent No. 165,649, dated July 13, 1875; application filed June 22, 1875.

*To all whom it may concern:*

Be it known that I, JOSEPH WURZNER, of Chicago, in the county of Cook and State of Illinois, have invented an Improvement in Air-Dried Bricks, of which the following is a specification:

My invention has for its object to produce a brick for building purposes which will harden on exposure to the atmosphere, possess great strength and tenacity, will not crack if nails are driven into it; and can be plastered without scratching or furring; and it consists in combining lime, sawdust, ashes, and plastering-hair, in varying proportions, according to the various purposes for which the different bricks are to be used, as more fully hereinafter set forth.

For bricks that are intended for outside walls, where the load to be carried is great, I take about forty per cent. of quicklime, the same of sawdust, ten per cent. of ashes, and ten per cent., or a sufficient quantity, of plastering-hair; mix thoroughly, temper with water, and mold into bricks, which are then dried in the air.

For inside or party walls, I use but twenty per cent. of lime, and increase the volume of sawdust to sixty per cent., without varying the proportions of the ashes or the hair.

The bricks are perfectly fire-proof, even with the increased percentage of sawdust, and are light, strong, and tenacious. They will take and hold firmly a finishing-coat of plaster, and do not sweat or absorb moisture.

What I claim as my invention is—

As a new article of manufacture, a brick composed of lime, sawdust, ashes, and plastering-hair, substantially in the proportions set forth.

JOSEPH WURZNER.

Witnesses:
 WM. H. LOTZ,
 GEO. FERRIS.